United States Patent Office.

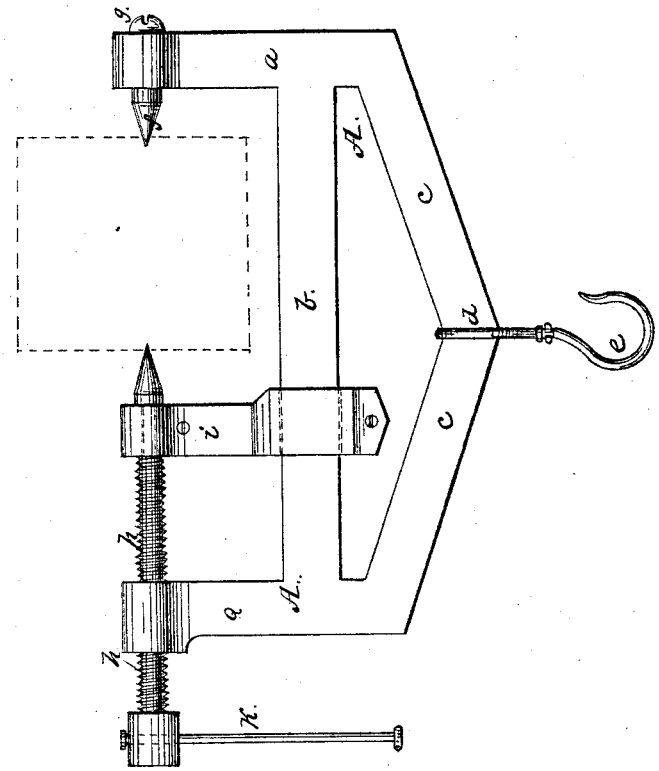

ALBERT HETH AND GAYLON HALL, OF ADAMS, NEW YORK.

Letters Patent No. 65,220, dated May 28, 1867.

IMPROVEMENT IN CLUTCH.

*The Schedule referred to in these Letters Patent and making part of the same.*

TO ALL WHOM IT MAY CONCERN:

Be it known that we, ALBERT HETH and GAYLON HALL, of Adams Centre, in the county of Jefferson, and State of New York, have invented a new and improved Clutch; and we do hereby declare that the following is a full, clear, and exact description thereof, which will enable others skilled in the art to make and use the same, reference being had to the accompanying drawing, forming part of this specification.

The drawing represents a side view of our improved clutch.

This invention relates to a device which is to be used for suspending hay-forks from rafters, but which may also be used advantageously for other similar purposes.

The invention consists in the use of a metal frame, from which a swivel-hook is suspended, to which the fork or other article may be hung. Two pointed rods are secured to the top of the frame, one being attached to a sliding-brace that is operated by a screw; and these points can be brought against the opposite sides of any rafter or beam, and thus the clutch is held on the rafter, and supports the fork by the swivel-hook.

A is a frame made of metal or of wood, consisting of two upright bars $a$ $a$, connected by a straight bar, $b$, and extending above and below that straight bar. Their lower ends are connected by a V-shaped bar, $c$, upon which a ring, $d$, slides, to which a hook, $e$, is attached by a swivel-joint, as shown. Through the upper end of one of the bars $a$ is secured a pin, $f$, being held in place by a nut, $g$, and being pointed on the inside, as shown. Through the other bar $a$ is fitted a screw, $h$, pointed on its inner end and supported by a sliding-brace, $i$, which moves on the bar $b$. The upper end of the bar $a$ forms the nut for the screw $h$. The screw $h$ is so arranged in the end of the sliding-brace $i$ that the latter has to move forward or backward with the end of the screw. The latter is operated by a slip-handle, K, or by any other suitable device. An independent pointed pin can be secured to the end of the brace $i$, similar to the manner in which the pin $f$ is held in the opposite brace $a$. In that case the screw $h$ would have to be arranged a little lower than it is when provided with a pointed end. The pin $f$ as well as the screw (or its equivalent) can revolve freely in their bearings, so that the whole frame A can swing on the rafter B, to which the frame is secured by the pointed pins shown in the drawing. The hay-fork or other article to be suspended from the said rafter is attached to the hook $e$, and has thus a very flexible attachment, as it can revolve around the stem of the swivel-hook, and can swing around the points $f$ and $h$ as may be desired.

What we claim as new, and desire to secure by Letters Patent, is—

A clutch for suspending hay-forks and other articles, said clutch consisting of a frame, A, provided with adjustable sliding-brace $i$ and revolving pointed pins $f$ and $h$, and with a swivel-hook, $e$, all made and operating substantially as herein shown and described.

ALBERT HETH,
GAYLON HALL.

Witnesses:
HENRY H. WILCOX,
JNO. G. COON.